US010826878B2

(12) United States Patent
Cox et al.

(10) Patent No.: US 10,826,878 B2
(45) Date of Patent: *Nov. 3, 2020

(54) DATABASE MANAGEMENT SYSTEM SHARED LEDGER SUPPORT

(71) Applicant: International Business Machines Corporation, Armonk, NY (US)

(72) Inventors: Michael C. Cox, Frederick, MD (US); Donna N. Dillenberger, Yorktown Heights, NY (US); Jeffrey W. Josten, San Jose, CA (US); James W. Pickel, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/299,889

(22) Filed: Mar. 12, 2019

(65) Prior Publication Data
US 2019/0215311 A1 Jul. 11, 2019

Related U.S. Application Data

(63) Continuation of application No. 15/217,888, filed on Jul. 22, 2016, now Pat. No. 10,277,561.

(51) Int. Cl.
| | |
|---|---|
| *H04L 29/06* | (2006.01) |
| *G06F 21/62* | (2013.01) |
| *H04L 9/08* | (2006.01) |
| *H04L 9/32* | (2006.01) |

(52) U.S. Cl.
CPC ...... *H04L 63/0428* (2013.01); *G06F 21/6227* (2013.01); *H04L 9/0891* (2013.01); *H04L 9/0894* (2013.01); *H04L 9/3236* (2013.01); *H04L 63/06* (2013.01); *H04L 63/0876* (2013.01); *H04L 2209/38* (2013.01)

(58) Field of Classification Search
CPC .. G06F 2221/2107; G06F 21/10; G06F 21/62; G06F 21/6209; G06F 21/6218; G06F 21/6227; H04L 63/0876; H04L 63/0428; H04L 9/0891; H04L 9/0894; H04L 9/3236; H04L 63/06; H04L 2209/38
USPC ........................................................ 713/165
See application file for complete search history.

(56) References Cited

U.S. PATENT DOCUMENTS

| | | | |
|---|---|---|---|
| 729,607 A | 6/1903 | Knox | |
| 5,596,747 A | 1/1997 | Katabami et al. | |
| 5,621,864 A * | 4/1997 | Benade | G06K 1/121 358/1.18 |

(Continued)

OTHER PUBLICATIONS

Morrison, The Rise of Immutable Data Stores, http://www.odbms.org/2015/10/the-rise--0f-immutable-data- ,tores/, Oct. 9, 2015, published at PwC website.

(Continued)

*Primary Examiner* — Shahriar Zarrineh

(57) ABSTRACT

A business application may provide a secure ledger update while maintaining anonymity and security from unauthorized third parties. One example may include receiving a new entry transaction to save data in a database/ledger. The example may also include receiving a request to add a record stored in a database with a new entry, adding the record by inserting the new entry, and enabling the new entry to be unchangeable from subsequent modification attempts based on an immutable attribute.

20 Claims, 5 Drawing Sheets

(56) References Cited

U.S. PATENT DOCUMENTS

| | | | |
|---|---|---|---|
| 5,751,949 A | 5/1998 | Thomson et al. | |
| 5,809,539 A | 9/1998 | Sakakibara et al. | |
| 6,003,024 A | 12/1999 | Bair et al. | |
| 6,118,872 A * | 9/2000 | Kashima | G06F 21/36 |
| | | | 380/205 |
| 6,145,065 A | 11/2000 | Takahashi et al. | |
| 6,336,114 B1 | 1/2002 | Garrison | |
| 6,516,317 B1 | 2/2003 | Samar et al. | |
| 6,606,631 B1 | 8/2003 | Martin et al. | |
| 6,662,198 B2 | 12/2003 | Satyanarayanan et al. | |
| 6,834,290 B1 | 12/2004 | Pugh et al. | |
| 7,016,497 B2 | 3/2006 | Henson et al. | |
| 7,093,137 B1 | 8/2006 | Sato et al. | |
| 7,401,358 B1 | 7/2008 | Christie et al. | |
| 7,661,141 B2 | 2/2010 | Dutta et al. | |
| 7,831,621 B1 | 11/2010 | Banks et al. | |
| 8,132,249 B2 | 3/2012 | Bichot et al. | |
| 8,707,438 B1 | 4/2014 | Hsu | |
| 8,832,148 B2 | 9/2014 | Kisin et al. | |
| 9,111,114 B1 | 8/2015 | Choi et al. | |
| 9,117,208 B2 | 8/2015 | Drury et al. | |
| 9,397,985 B1 | 7/2016 | Robert et al. | |
| 9,485,256 B1 * | 11/2016 | Jerrard-Dunne | H04L 63/10 |
| 9,588,973 B2 | 3/2017 | Shetty et al. | |
| 9,674,202 B1 | 6/2017 | Margel et al. | |
| 9,798,893 B2 * | 10/2017 | Arnold | G06F 16/22 |
| 9,858,436 B2 | 1/2018 | Arnold et al. | |
| 10,114,969 B1 | 10/2018 | Chaney et al. | |
| 2002/0010681 A1 * | 1/2002 | Hillegass | G06F 21/10 |
| | | | 705/59 |
| 2003/0115552 A1 * | 6/2003 | Jahnke | G06F 9/454 |
| | | | 715/201 |
| 2004/0044655 A1 | 3/2004 | Cotner et al. | |
| 2004/0054922 A1 | 3/2004 | Hiraga et al. | |
| 2004/0083197 A1 | 4/2004 | Iwata et al. | |
| 2004/0139116 A1 | 7/2004 | Porter | |
| 2004/0267800 A1 | 12/2004 | Gupta | |
| 2005/0120288 A1 | 6/2005 | Boehme et al. | |
| 2006/0080324 A1 | 4/2006 | Bower et al. | |
| 2006/0143225 A1 * | 6/2006 | Brendle | G06F 16/289 |
| 2006/0288035 A1 | 12/2006 | Viavant | |
| 2007/0074047 A1 | 3/2007 | Metzger et al. | |
| 2007/0198591 A1 | 8/2007 | Teng et al. | |
| 2007/0299816 A1 | 12/2007 | Arora et al. | |
| 2008/0098046 A1 | 4/2008 | Alpern et al. | |
| 2008/0133925 A1 | 6/2008 | Abe et al. | |
| 2008/0133935 A1 | 6/2008 | Elovici et al. | |
| 2008/0253572 A1 * | 10/2008 | Gassoway | G06F 21/335 |
| | | | 380/278 |
| 2008/0284597 A1 | 11/2008 | Shah | |
| 2008/0294508 A1 * | 11/2008 | Alan | G06Q 20/102 |
| | | | 705/14.15 |
| 2008/0317242 A1 | 12/2008 | Bohush et al. | |
| 2008/0317251 A1 | 12/2008 | Foody | |
| 2009/0019363 A1 | 1/2009 | Andreev et al. | |
| 2009/0041249 A1 * | 2/2009 | Tanaka | H04L 9/0891 |
| | | | 380/277 |
| 2009/0182747 A1 | 7/2009 | Bird et al. | |
| 2009/0292711 A1 | 11/2009 | Konik et al. | |
| 2010/0161995 A1 | 6/2010 | Browning | |
| 2010/0211554 A1 | 8/2010 | Reid et al. | |
| 2010/0262625 A1 | 10/2010 | Pittenger | |
| 2011/0219020 A1 | 9/2011 | Oks et al. | |
| 2011/0289447 A1 | 11/2011 | Kawaguti et al. | |
| 2011/0320480 A1 * | 12/2011 | Kisin | G06F 17/00 |
| | | | 707/769 |
| 2012/0109827 A1 | 5/2012 | Otterström | |
| 2012/0197925 A1 | 8/2012 | Balagopalan et al. | |
| 2012/0209884 A1 | 8/2012 | Mattsson et al. | |
| 2012/0254842 A1 | 10/2012 | Henderson | |
| 2012/0296889 A1 * | 11/2012 | Davydok | G06F 16/2393 |
| | | | 707/713 |
| 2012/0323873 A1 | 12/2012 | Mistry et al. | |
| 2013/0204914 A1 * | 8/2013 | Behram | G06Q 50/22 |
| | | | 708/200 |
| 2013/0238351 A1 | 9/2013 | Burns et al. | |
| 2013/0262403 A1 * | 10/2013 | Milousheff | G06F 16/2365 |
| | | | 707/691 |
| 2014/0006458 A1 | 1/2014 | Hsieh et al. | |
| 2014/0052999 A1 | 2/2014 | Aissi et al. | |
| 2014/0095547 A1 | 4/2014 | Guo et al. | |
| 2014/0149387 A1 | 5/2014 | Konik et al. | |
| 2014/0289715 A1 | 9/2014 | Meijer et al. | |
| 2015/0039901 A1 | 2/2015 | Freeman et al. | |
| 2015/0100606 A1 | 4/2015 | Bonner et al. | |
| 2015/0135327 A1 | 5/2015 | Wall | |
| 2015/0227693 A1 | 8/2015 | Ahmed | |
| 2015/0254272 A1 | 9/2015 | Regni et al. | |
| 2016/0009244 A1 | 1/2016 | Anderson | |
| 2016/0048559 A1 | 2/2016 | Ulke et al. | |
| 2016/0048792 A1 | 2/2016 | Finkelstein et al. | |
| 2016/0062954 A1 * | 3/2016 | Ruff | G06F 17/21 |
| | | | 715/249 |
| 2016/0063100 A1 | 3/2016 | Anton et al. | |
| 2016/0080397 A1 | 3/2016 | Bacastow et al. | |
| 2016/0147786 A1 | 5/2016 | Andrei et al. | |
| 2016/0188617 A1 | 6/2016 | Gaikwad | |
| 2016/0203448 A1 * | 7/2016 | Metnick | G06Q 20/065 |
| | | | 705/64 |
| 2016/0224802 A1 | 8/2016 | Arnold et al. | |
| 2016/0321654 A1 * | 11/2016 | Lesavich | G06F 21/6245 |
| 2016/0328429 A1 | 11/2016 | Lipcon | |
| 2017/0005804 A1 | 1/2017 | Zinder | |
| 2017/0041322 A1 | 2/2017 | Kurian et al. | |
| 2017/0169248 A1 * | 6/2017 | Darcy | G06F 21/6209 |
| 2017/0199920 A1 | 7/2017 | Pearson et al. | |
| 2017/0249472 A1 | 8/2017 | Levy et al. | |
| 2017/0295023 A1 | 10/2017 | Madhavan et al. | |
| 2017/0359321 A1 * | 12/2017 | Rindal | H04L 63/0471 |
| 2017/0372392 A1 * | 12/2017 | Metnick | G06Q 30/018 |
| 2018/0123790 A1 | 5/2018 | Itamar et al. | |
| 2019/0139047 A1 * | 5/2019 | Ronnow | H04L 63/10 |

OTHER PUBLICATIONS

Bitcoin About Block Explorer, https://blockexplorer.com/, web tool.

Bitcoin.info, https://bitcoin.info.

Carrel, Favoring Immutability in Database Design, http://programmers.stackexchange.com/questions/105851/avoring-immutability-in-database-design, Sep. 5, 2011, Blog.

Foresti, (2011). Overview of the State of the Art. Preserving Privacy in Data Outsourcing, 9-30. See highlighted sections.

Hickey, Intro to Datomic, http://www.datomic.com/, video.

Jaunin, From SQL to the Immutable Database, http://blog.nexthink.com/from-sql-to-the-immutable- :latabase/, Oct. 14, 2015, Blog.

Kong et al., (2014). Enabling Access Control in Partially Honest Outsourced Databases. International Journal of Database Theory and Application, 7(3), 63-72. See highlighted sections.

McConaghy et al., Big Chain DB: A Scalable Blockchain Database, https://blockexplorer.com/, Jun. 8, 2016, GmbH, Berlin Germany.

Mykletun et al., (2006). Authentication and integrity in outsourced databases. ACM Transactions on Storage {TOS), 2(2), 107-138. See highlighted sections.

Nyeggen, Immutable SQL, http://nyeggen.com/post/2014-02-01-immutable-sql/, Feb. 1, 2014, Blog.

Wang et al., Verifiable auditing for outsourced database in cloud computing. IEEE Transactions on Computers, 64(11), 3293-3303. See highlighted section.

List of IBM Patents or Patent Applications Treated as Related, todays date.

Michael C. Cox et al., "Database Management System Shared Ledger Support", U.S. Appl. No. 15/217,888, filed Jul. 22, 2016.

* cited by examiner

DATABASE MANAGEMENT SYSTEM SHARED LEDGER SUPPORT

TECHNICAL FIELD

This application relates to database management system support and more specifically to immutable support for shared ledger entries in the database management system.

BACKGROUND

Security is a priority when important data, such as financial, health, personal and business data is being shared over a network. blockchain is a technology that came into use with Bitcoin that used blockchain to exchange financial information. As important data is shared over a network using blockchain or distributed ledger technologies, security, volume and throughput becomes paramount. Emerging blockchain technologies lack the ability to support high volume concurrent transactions (e.g. 100,000s of transactions per second) and complex query/analytics support.

Database management systems are able to support complex queries and volume requirements. However, database management systems lack the immutability of blockchain data. The application described in this document provides a blockchain that will be able to support volume, security and immutability.

SUMMARY

Example embodiments provide a method that includes at least one of receiving a new entry record, which will be stored in a database, optionally creating different encryption keys which can be used to sign and encrypt the data record and updating the new record in the database by inserting the new record and enabling the database to be unchangeable from subsequent modification attempts. Encryption keys can be optionally used to keep the data private. If the members of a corresponding blockchain decide to enable their data to be public, encryption keys need not be used for those data records that users or blockchain members would like others to read. This embodiment also provides the configuration option of having different records encrypted by different keys so the owners of those records can choose to give access to records x,y,z to users/members 1,2,3 and give access to records a,b,z to users/members 4,5,6.

One example method of operation includes at least one of receiving a new transaction request to add a record stored in a database with a new entry, encrypting the record, and updating the record by inserting the new entry and enabling the new entry to be unchangeable from subsequent modification attempts.

Another example method may include an apparatus with a receiver configured to receive a new transaction request to add a new record stored in a database with a new entry, and a processor configured to perform at least one of encrypt the record, and add the record and insert the new entry and enable the new entry to be unchangeable from subsequent modification attempts.

Yet another example embodiment may include a non-transitory computer readable storage medium configured to store instructions that when executed causes a processor to perform receiving a new transaction request to add a record stored in a database with a new entry, encrypting the record, and updating the record by adding the new entry and enabling the new entry to be unchangeable from subsequent modification attempts.

Another example embodiment may also include a method that includes receiving a request to add a record stored in a database with a new entry, updating the record by adding the new entry, and enabling the new entry to be unchangeable from subsequent modification attempts based on an immutable attribute.

Still another example embodiment may include an apparatus that includes a receiver configured to receive a new transaction request to add a record stored in a database with a new entry, and a processor configured to add the record by the new entry being inserted, and enable the new entry to be unchangeable from subsequent modification attempts based on an immutable attribute.

Yet still a further example embodiment may include a non-transitory computer readable storage medium configured to store instructions that when executed causes a processor to perform receiving a request to add a record stored in a database with a new entry, adding the record by inserting the new entry, and enabling the new entry to be unchangeable from subsequent modification attempts based on an immutable attribute.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide an application and/or software procedure which provides an operation to manage blockchain data, such as accumulating ledger transactions from customer/merchant sites. The transactions can also be included in a DBMS service operated in the cloud. The records inserted in a database can optionally be signed by a key and also encryption keys can be used to encrypt the data. In general, the blockchain permits a single shared trusted ledger between multiple entities without the need for an intermediary.

Certain DBMS can support high transaction rates, analytics, client authentication, and data replication across multiple instances of a database. Also, "chaincode/smart contracts" can be managed against the database values (i.e., stored SQL procedures). However, support for immutable transactions requires additional consideration. For example, once a transaction is inserted and committed into the DBMS, there must be some guarantee that this entry cannot be altered or deleted in any way to preserve the ledger. Also, the DBMS should support encryption to protect and control access to the transactions recorded in the ledger.

Figure 1:
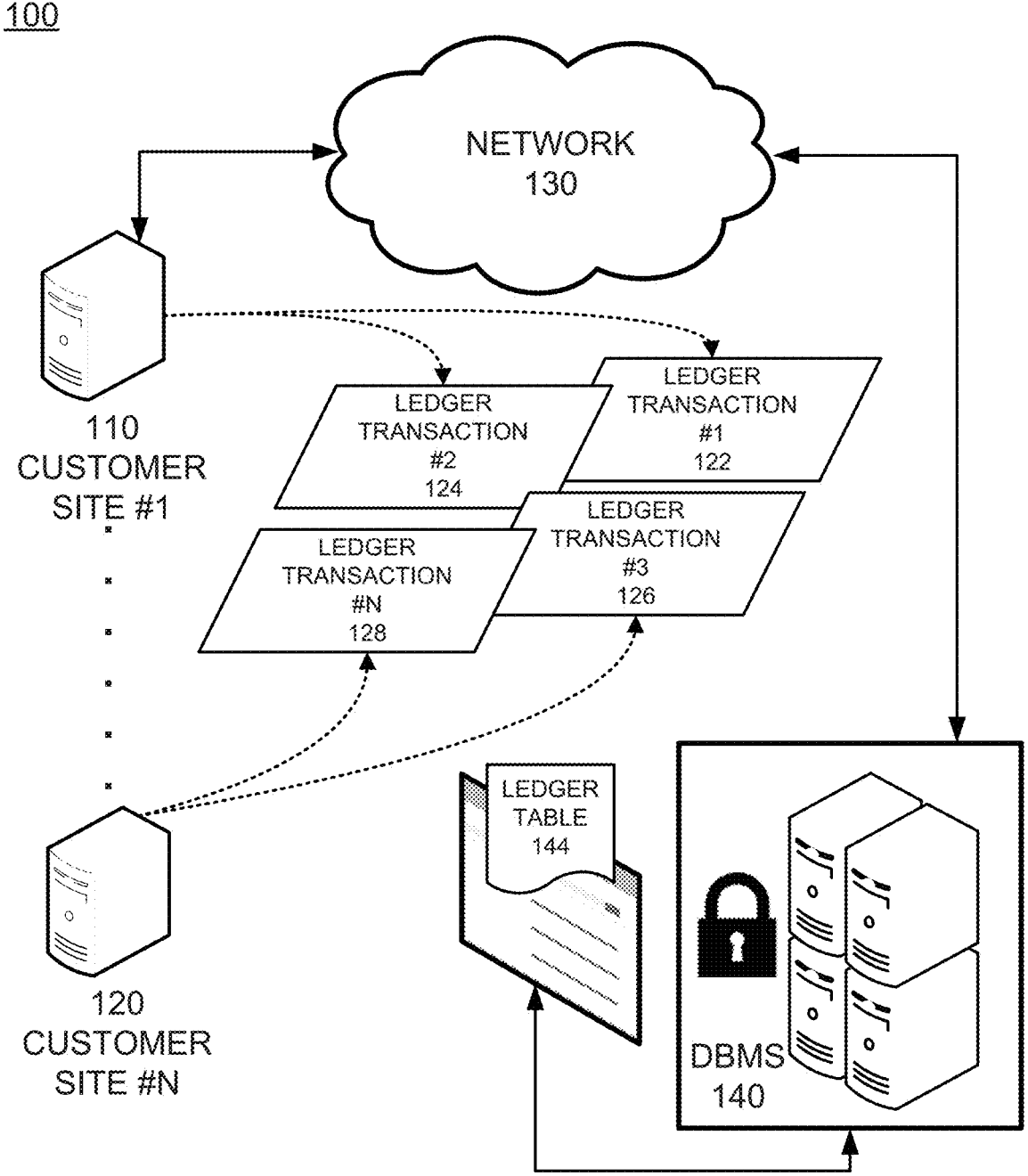
FIG. 1 illustrates an example communication network with various ledger transactions creating and forwarded to a secure ledger management database management system (DBMS) according to an example embodiment.

FIG. 1 illustrates an example communication network with various ledger transactions creating and forwarded to a secure ledger management database management system (DBMS) according to an example embodiment. Referring to FIG. 1, the network 100 includes one or more customer sites 110 and 120, which represent the servers managing customer transactions which add data to an existing ledger or create a new ledger as indicated by the various ledger transactions 122, 124, 126 and 128. The transactions may originate from one customer site or from many customer sites. Each of the transactions are stored in a common ledger table 144 that is stored in the DBMS 140 which may be in the network cloud 130 or at a remote management site.

During a table update procedure, the table inserts should be immutable from third parties. As used herein, the term unchangeable or immutable may be used interchangeably. The rows in the immutable table 144 include the ledger data. The DBMS 140 enforces custom logic for the table 144 so the rows/columns cannot be altered once the row insertion is committed to the table 144. Also, the DBMS 140 may use encryption to encrypt data inserted into the ledger table 144 which keeps other user devices and accounts from access to other users' data.

In general, no users or administrators would have access to the ledger data. In the event that a user desires to provide access to their ledger data to an auditor or other users, the user would command the DBMS 140 to offer the indicated user access to the encrypted data owned by that user. This may be an individual entry (i.e., one table row) or a series of entries (i.e., three table rows) received from a common customer site. Once the data is received and logged in the ledger table 144, the DBMS 140 would use a corresponding encryption key to decrypt the data for the user that has been granted access.

Figure 2:
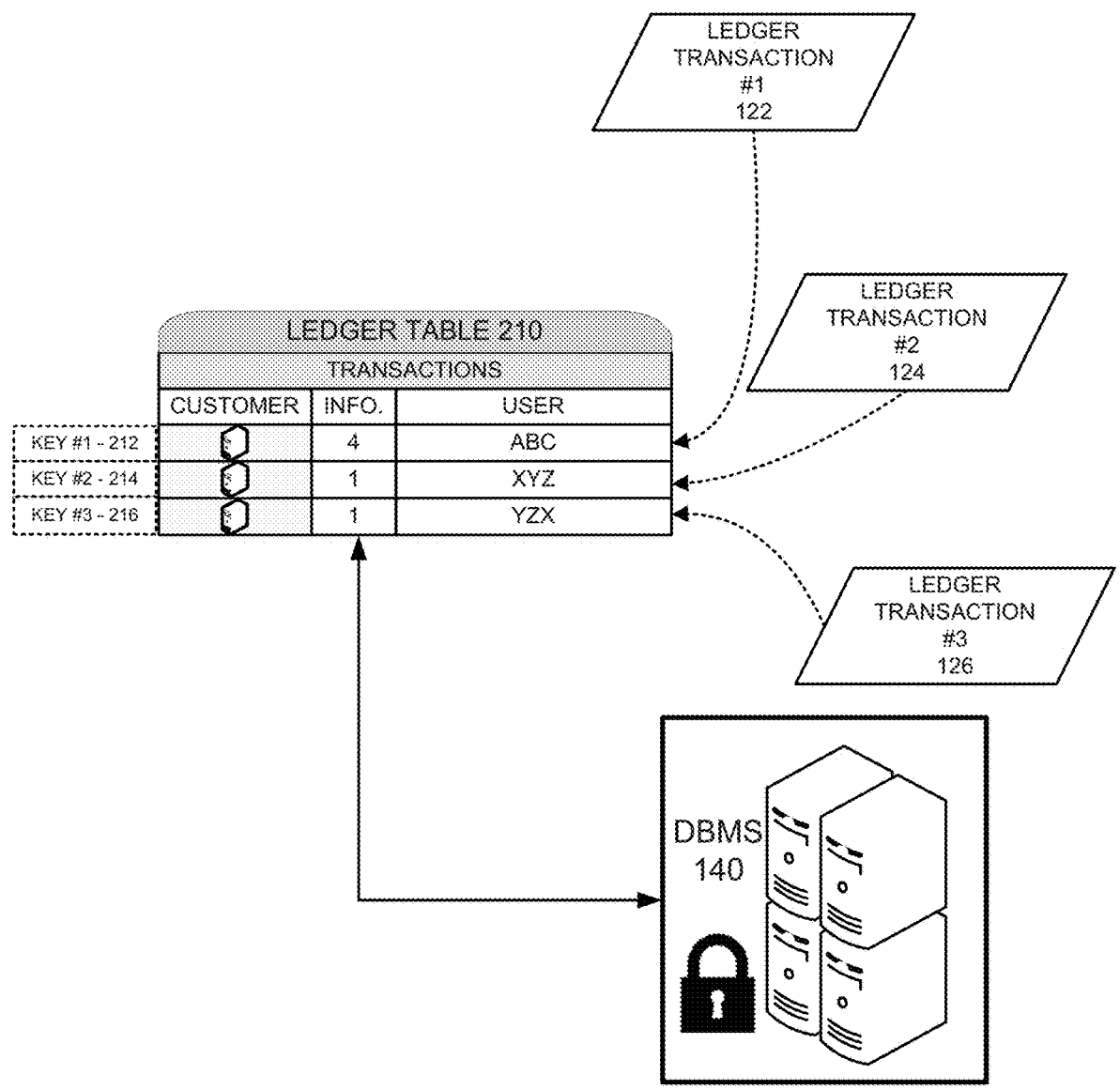
FIG. 2 illustrates details of a row adding procedure for adding new rows to a ledger table and optionally creating encryption keys to the transactions according to an example embodiment.

FIG. 2 illustrates details of a row adding procedure for adding new rows to a ledger table and assigning keys to the transactions according to an example embodiment. Referring to FIG. 2, the example 200 includes the various ledger transactions 122, 124, 126 being entered into the ledger table 210 and having a corresponding encryption key 212, 214 and 216 optionally assigned to each row entry, respectively. The unique keys may be generated for a single row entry or multiple row entries. An immutable table attribute may specify when the table is created to indicate that the table will act as a shared ledger. For the "immutable" table 210, the DBMS 140 will enforce a policy that once a row is inserted and committed, the row cannot be altered in any way.

When adding content to the table, new rows may be added through an 'INSERT' statement. Bulk loads performed via database utilities may be disallowed. Once a row is committed it cannot be updated or deleted. Inserted rows are logged and are fully recoverable. Normal DBMS backup and recovery mechanisms are permitted. However, only recovery to currency is permitted. Recovery to a prior point in time is not permitted. Altering the table to add new columns may be permitted. However, the table cannot be modified to disable the "immutable" attribute. Any database utility is permitted which does not modify the contents of the rows. For example, a 'REORG' utility may be permitted since this utility reclaims space, or re-orders rows for query performance but does not attempt to modify row content. However the 'DISCARD' option of a 'REORG' is not permitted since that option causes rows to be deleted from the table.

In general, a DBMS that provides support for transparent archiving can permit rows for an "immutable" table to be archived, since this fully preserves all the rows' content. The DBMS 140 can also optionally generate encryption keys to control access to the ledger. Data inserted in the ledger could optionally be encrypted using an encryption key.

Figure 3:
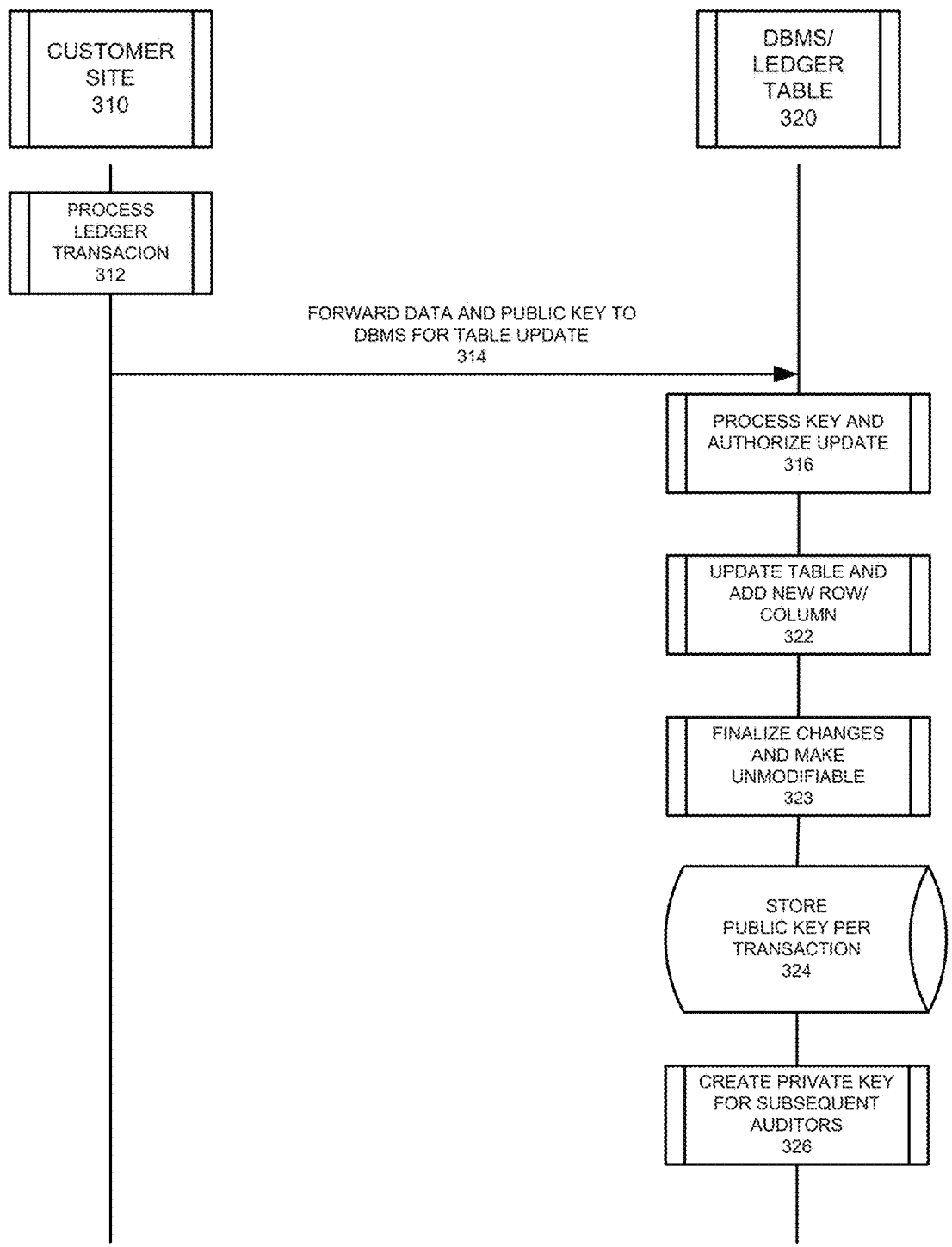
FIG. 3 illustrates a system signaling diagram of ledger transactions conducted between a customer site, the DBMS and a corresponding ledger table according to example embodiments.

FIG. 3 illustrates a system signaling diagram of ledger transactions conducted between a customer site, the DBMS and a corresponding ledger table according to example embodiments. Referring to FIG. 3, the communication between the customer site(s) 310, and the DBMS 320 and actual ledger table are illustrated in an example 300 of updating and securing the table data. Once the customer site processes a ledger transaction 312, the DBMS 320 will receive the updates 314 and process the entry 316. The table is instructed to update with an authorized update, such as a new row entry. The update occurs by adding a new entry 322, such as a new row(s) to the existing table ledger. The changes may be finalized and set for permanent storage so they can no longer be modified 323. The DBMS can optionally store the encryption keys for each transaction 324 and create private keys for subsequent auditors 326.

One example method of operation may include receiving a new transaction request to update a record stored in a database with a new entry, encrypting the record, and updating the record by inserting the new entry and enabling the new entry to be unchangeable from subsequent modification attempts. The record may include a table and the new entry may be a new row in the table. The table includes a plurality of rows each of which are assigned to a corresponding plurality of unique encryption keys depending on the ledger transactions received. The method may also include creating encryption keys to decrypt the new entry, and forwarding the encryption keys to authorized devices. Also, the method provides receiving an insert statement, and updating the table to include the new row when the insert statement is received with the new row to the table. The method may also include receiving a database utility command, determining whether the database utility command will modify table row content, and blocking the database utility command from executing when it is determined the database utility command will modify previously updated table row content. Additionally, the method may include updating the table to include a plurality of rows, such that each row represents a ledger update from customer data transactions, and storing a plurality of unique encryption keys corresponding to the plurality of table rows.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
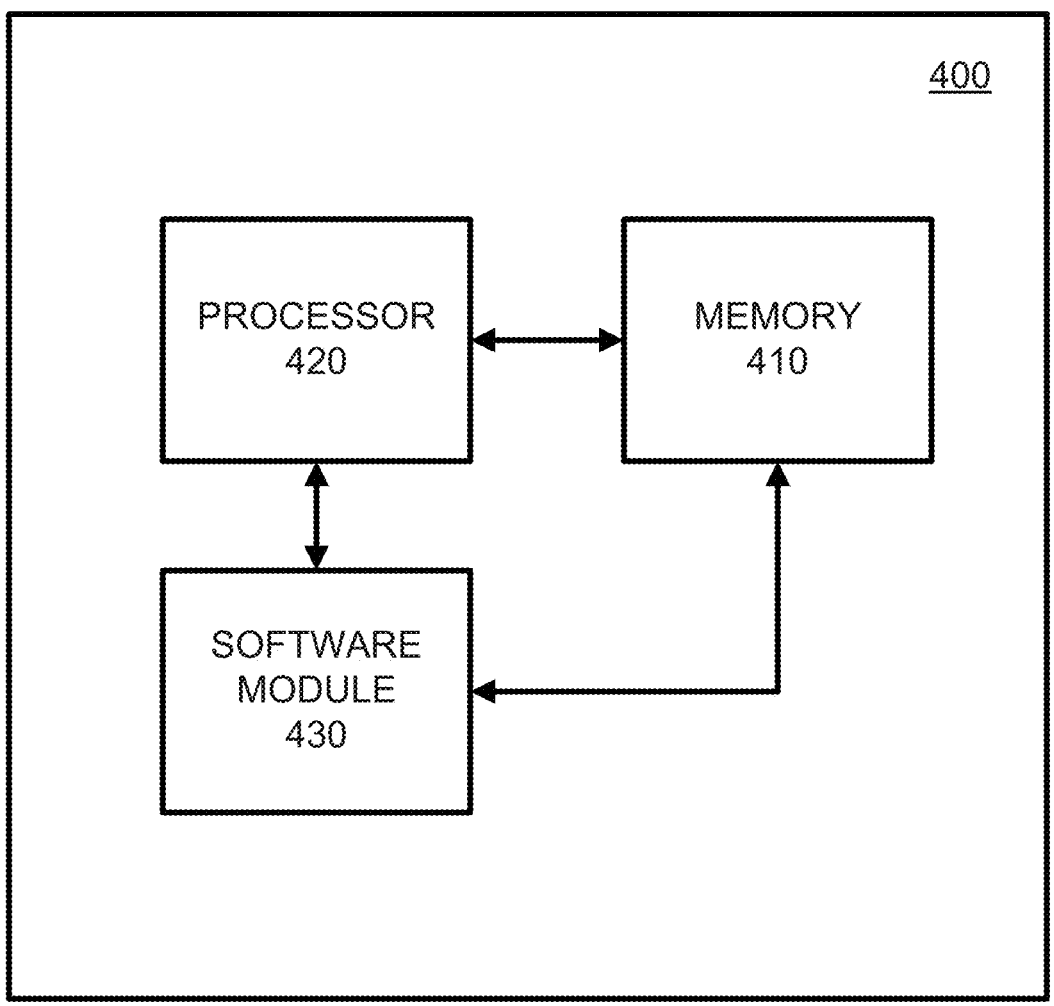
FIG. 4 illustrates a computer readable medium and non-transitory computer processing platform for performing procedures according to example embodiments of the present application.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Figure 5:
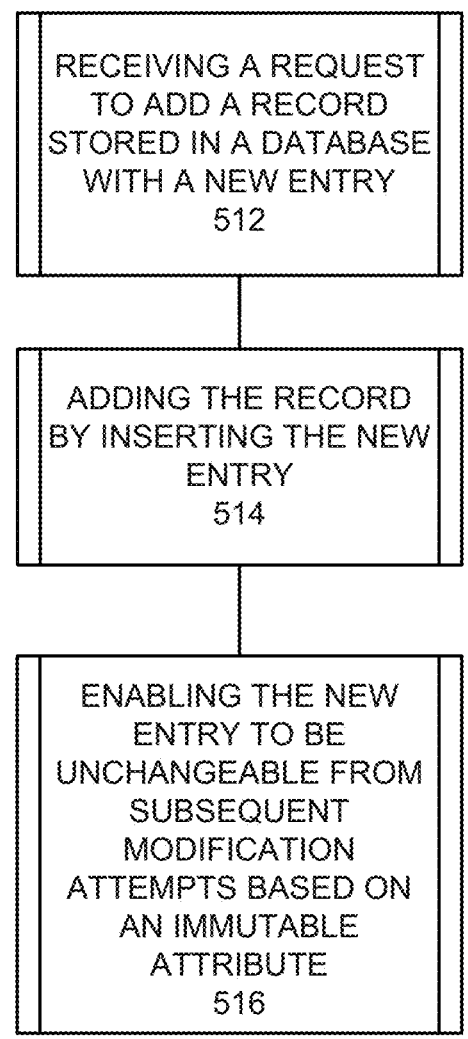
FIG. 5 illustrates an example flow diagram of an example method of operation according to example embodiments.

FIG. 5 illustrates an example flow diagram of an example method of operation according to example embodiments. Referring to FIG. 5, the method may include receiving a request to update a record stored in a database with a new entry 512 and updating the record by inserting the new entry at 514 and enabling the new entry to be unchangeable from subsequent modification attempts based on an immutable attribute 516. The attribute may be a flag or character enabler that when enabled does not permit any changes by any database operand or command attempting to make changes to be executed. The processor 420 may be used to execute the operations included in the above-noted example method.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving, via a database management system, a request to add a record to a database of the database management system via a new entry associated with a user;
   adding, via the database management system, the record to the database by using a database utility command to insert the new entry as a new row in a table of the database;
   enabling, via the database management system, the new entry to be unchangeable from subsequent modification attempts based on an immutable attribute associated with the new entry, and that identifies that the table functions as a shared ledger, wherein the immutable attribute is a flag or character enabler that when enabled does not permit any changes by any database operand or command attempting to make changes to be executed, and the new entry being committed to the table;
   enforcing, via the database management system, a policy preventing use of a database utility command to modify or delete committed table rows of the table and allowing use of a database utility command to modify the table by adding new table columns to the table;
   receiving, via the database management system, a request from the user to grant access to the new entry to another user;
   forwarding, via the database management system, a private encryption key to the another user in response to the request; and
   decrypting, via the database management system, the new entry for access by the another user based on receipt of the private encryption key from the another user, while preventing the another user from changing the new entry.

2. The method of claim 1, further comprising storing, via the database management system, an encryption key corresponding to encrypted data associated with the new entry, wherein the encryption key is uniquely assigned to the new row in the table, and wherein the encryption key is stored among a corresponding plurality of different encryption keys corresponding to other rows in the table to enable an auditor entity to subsequently verify the new row is stored in the table.

3. The method of claim 2, wherein the table comprises a plurality of rows each of which are assigned to the corresponding plurality of different encryption keys.

4. The method of claim 1, further comprising specifying, by the immutable attribute, that the table is to act as the immutable shared ledger for users in communication with the database.

5. The method of claim 1, further comprising:
   receiving an insert statement; and
   updating the table to include the new row when the insert statement is received with the new row to the table.

6. The method of claim 1, further comprising:
   receiving a database utility command;
   determining whether the database utility command will modify table row content; and
   blocking the database utility command from executing when it is determined the database utility command will modify previously updated table row content.

7. The method of claim 1, further comprising:
   updating the table to include a plurality of rows, wherein each row represents a ledger update from customer data transactions; and
   storing a plurality of unique encryption keys, each of which are different, corresponding to the plurality of rows of the updated table.

8. An apparatus, comprising:
   a processor configured to:
      receive, via a database management system, a request to add a record to a database of the database management system via a new entry associated with a user;
      add, via the database management system, the record to the database via a database utility command to insert the new entry as a new row in a table of the database;
      enable, via the database management system, the new entry to be unchangeable from subsequent modification attempts based on an immutable attribute associated with the new entry, and that identifies that the table functions as a shared ledger, wherein the immutable attribute is a flag or character enabler that when enabled does not permit any changes by any database operand or command attempting to make changes to be executed, and the new entry being committed to the table;
      enforce, via the database management system, a policy that prevents use of a database utility command to modify or delete committed table rows of the table and allowing use of a database utility command to modify the table via an addition of new table columns to the table;
      receive, via the database management system, a request from the user to grant access to the new entry to another user;
      forward, via the database management system, a private encryption key to the another user in response to the request; and
      decrypt, via the database management system, the new entry for access by the another user based on receipt of the private encryption key from the another user, while the another user is unable to change the new entry.

9. The apparatus of claim 8, wherein the processor is further configured to store, via the database management system, an encryption key corresponding to encrypted data associated with the new entry, wherein the encryption key is uniquely assigned to the new row in the table, and wherein the encryption key is stored among a corresponding plurality of different encryption keys corresponding to other rows in the table to enable an auditor entity to subsequently verify the new row is stored in the table.

10. The apparatus of claim 9, wherein the table comprises a plurality of rows each of which are assigned to the corresponding plurality of different encryption keys.

11. The apparatus of claim 8, wherein the processor is further configured to specify that the table is to act as the immutable shared ledger for users in communication with the database.

12. The apparatus of claim 8, wherein the processor is further configured to:
receive an insert statement; and
update the table to include the new row when the insert statement is received with the new row to the table.

13. The apparatus of claim 8, wherein the processor is further configured to:
receive a database utility command,
determine whether the database utility command will modify table row content; and
block the database utility command from execution when it is determined the database utility command will modify previously updated table row content.

14. The apparatus of claim 8, wherein the processor is further configured to:
update the table to include a plurality of rows, wherein each row represents a ledger update from customer data transactions; and
store a plurality of unique encryption keys, each of which are different, corresponding to the plurality of rows of the updated table.

15. A non-transitory computer readable storage medium configured to store at least one instruction that when executed by a processor causes the processor to perform:
receiving, via a database management system, a request to add a record to a database of the database management system via a new entry associated with a user;
adding, via the database management system, the record to the database by using a database utility command to insert the new entry as a new row in a table of the database;
enabling, via the database management system, the new entry to be unchangeable from subsequent modification attempts based on an immutable attribute associated with the new entry, and that identifies that the table functions as a shared ledger, wherein the immutable attribute is a flag or character enabler that when enabled does not permit any changes by any database operand or command attempting to make changes to be executed, and the new entry being committed to the table;
enforcing, via the database management system, a policy preventing use of a database utility command to modify or delete committed table rows of the table and allowing use of a database utility command to modify the table by adding new table columns to the table;
receiving, via the database management system, a request from the user to grant access to the new entry to another user;
forwarding, via the database management system, a private encryption key to the another user in response to the request; and
decrypting, via the database management system, the new entry for access by the another user based on receipt of the private encryption key from the another user, while preventing the another user from changing the new entry.

16. The non-transitory computer readable storage medium of claim 15, further configured to store at least one instruction that when executed by the processor causes the processor to perform storing an encryption key corresponding to encrypted data associated with the new entry, wherein the encryption key is uniquely assigned to the new row in the table, and wherein the encryption key is stored among a corresponding plurality of different encryption keys corresponding to other rows in the table to enable an auditor entity to subsequently verify the new row is stored in the table.

17. The non-transitory computer readable storage medium of claim 16, wherein the table comprises a plurality of rows each of which are assigned to the corresponding plurality of different encryption keys.

18. The non-transitory computer readable storage medium of claim 15, further configured to store at least one instruction that when executed by the processor causes the processor to perform specifying, by the immutable attribute, that the table is to act as the immutable shared ledger for users in communication with the database.

19. The non-transitory computer readable storage medium of claim 15, further configured to store at least one instruction that when executed by the processor causes the processor to perform:
receiving an insert statement; and
updating the table to include the new row when the insert statement is received with the new row to the table.

20. The non-transitory computer readable storage medium of claim 15, further configured to store at least one instruction that when executed by the processor causes the processor to perform:
receiving a database utility command;
determining whether the database utility command will modify table row content;
blocking the database utility command from executing when it is determined the database utility command will modify previously updated table row content;
updating the table to include a plurality of rows, wherein each row represents a ledger update from customer data transactions; and
storing a plurality of unique encryption keys, each of which are different, corresponding to the plurality of rows of the updated table.

* * * * *